(12) United States Patent
Seshadri

(10) Patent No.: US 8,812,967 B2
(45) Date of Patent: Aug. 19, 2014

(54) ENABLING A USER TO HAVE A CUSTOM DESIRED EXPERIENCE WHILE ACCESSING AN ELECTRONIC FILE

(75) Inventor: Sreekumar K. Seshadri, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 789 days.

(21) Appl. No.: 10/709,791

(22) Filed: May 28, 2004

(65) Prior Publication Data

US 2005/0268239 A1 Dec. 1, 2005

(51) Int. Cl.
*G06F 3/048* (2013.01)
*G06F 3/0482* (2013.01)

(52) U.S. Cl.
CPC .................... *G06F 3/0482* (2013.01)
USPC ............ 715/764; 715/248; 715/747; 715/866

(58) Field of Classification Search
USPC ......... 715/745–747, 700, 701, 702, 727, 728, 715/764, 765, 866, 248
See application file for complete search history.

(56) References Cited

U.S. PATENT DOCUMENTS

| | | | | |
|---|---|---|---|---|
| 5,371,844 | A * | 12/1994 | Andrew et al. | 715/747 |
| 5,596,702 | A * | 1/1997 | Stucka et al. | 715/746 |
| 6,469,714 | B2 * | 10/2002 | Buxton et al. | 715/762 |
| 7,783,971 | B2 * | 8/2010 | Villaron et al. | 715/248 |
| 2002/0054086 | A1 * | 5/2002 | Van Oostenbrugge et al. | 345/744 |
| 2002/0101444 | A1 * | 8/2002 | Novak et al. | 345/744 |
| 2002/0149629 | A1 * | 10/2002 | Craycroft et al. | 345/861 |
| 2004/0230888 | A1 * | 11/2004 | Kramer et al. | 715/501.1 |

OTHER PUBLICATIONS

Patrice-Anne Rutledge and Tom Mucciolo, "Special Edition Using Microsoft® PowerPoint® 2002", published Jun. 21, 2001 by Que, pp. 51-54 and 248-249.*
Keith Schengili-Roberts, "Core CSS: Cascading Style Sheets," published Sep. 23, 2003 by Prentice Hall, 2nd edition, pp. 61-62.*
Urs Fleisch, "The Kid3 Handbook," published Aug. 4, 2003, available at web.archive.org/web/20030804010016/http://kid3.sourceforge.net/kid3_en.html.*
"WYSIWYG," Wikipedia, Dec. 9, 2003, available at <http://web.archive.org/web/20031209154431/http://en2.wikipedia.org/wiki/WYSIWYG>.*
"Mac OS 7.0," Mac History, available at <www.mac-history.net/computer-history/2008-05-24/mac-os-70-2>.*
Mary Millhollon and Katherine Murray, "Microsoft Office Word 2003 Inside Out," Nov. 12, 2003, Microsoft Press, pp. 453-472.*
Jeff Johnson and Richard J. Beach, "Styles in Document Editing Systems," Jan. 1988, IEEE Computer, vol. 21, Issue 1, pp. 32-43.*

* cited by examiner

*Primary Examiner* — Doon Chow
*Assistant Examiner* — Andrew T Chiusano
(74) *Attorney, Agent, or Firm* — Narendra Reddy Thappeta

(57) ABSTRACT

An aspect of the present invention enables a user to have a custom desired experience while accessing electronic files. A digital processing system provides the user the ability to define an experience profile with experience profile containing experience attributes. The user may be provided the ability to associate an experience profile with the electronic file. The digital processing system then controls the experience attributes to create a custom defined experience. As a result, two different electronic files (accessed using a single application) may be associated with two different experience profiles. In addition, experience attributes rooted in dissimilar applications may also be included in an experience profile.

19 Claims, 5 Drawing Sheets

310: Font - 'Appearance: Bold', 'Color: Blue', Size: 'medium';
(# Defaults overridden by the document internal format or by application defaults; but higher priority than the defaults specified by the operating systems)

340: Cursor - 'Shape: Flower', 'Color: Red'

360: Music - 'Song: m:\mydir\songs\Track10', 'Volume: low'

FIG. 3

ENABLING A USER TO HAVE A CUSTOM DESIRED EXPERIENCE WHILE ACCESSING AN ELECTRONIC FILE

BACKGROUND OF INVENTION

1. Field of the Invention

The present invention relates to digital systems, and more specifically to a method and apparatus for enabling a user to have a custom desired experience while accessing an electronic file.

2. Related Art

An electronic file generally contains many bytes of data, which can be accessed by corresponding user applications. For example, a word processing software (such as MS-Word software and Word Perfect software, widely available in the market place) may enable a user to edit/add/delete the content of a corresponding electronic file. As another example, an electronic file may contain data representing music, and the data may be accessed by technologies such as MP3-players to play the music. As may be readily appreciated, the user is provided access to a substantial portion (e.g., not less than a few hundred bytes, at least in situations more than that much content is present in the electronic file).

There are generally various experience attributes that are controlled by a hardware and software using which an electronic file is accessed. For example, with respect to word processing software, various visual features and sounds are controlled by the word processing software, the document internal attributes, and/or the operating system on which the word processing software is supported.

In one prior word processing software implemented in MS-Windows operating system, the default display attributes (e.g., background and foreground colors, cursor shape) may be controlled by appropriate configuration of various options in the processing software. option further provides that the same display attributes as those specified for the operating system. However, the attributes specified internal to a document generally override the default display attributes. In other words, a user may specify custom desired display attributes within the document or have the software use the attributes specified by the operating system or the user application.

One problem with such an approach is that the same default attributes are applied to all the electronic files accessed using the same user application. respect to the word processing software example of above, the same default attributes are generally applied to all the documents opened using the word processing software. On the other hand, a user may wish to have different default attributes for different files (without having to change the contents of the files). In general, what is therefore needed is an approach which enables a user to have potentially a custom desired experience while accessing each document.

BRIEF DESCRIPTION OF DRAWINGS

The present invention will be described with reference to the accompanying drawings briefly described below.

FIG. 3 is a text depicting an example experience profile in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present invention, a digital processing system enables a user to specify different experience profiles associated with different electronic files. In an embodiment, the experience profile is provided external to the associated electronic file. Each experience profile may contain various desired experience attributes, which control the user experience when an associated electronic file is accessed.

By including the desired experience attributes in an experience profile and associating the experience profile with an electronic file, a user may have a custom desired experience while accessing each electronic file. In addition, each experience profile may be associated with multiple electronic files as the experience profile is provided external to the electronic files.

Also, a user may change/control the experience in accessing only some of the electronic files without having to change the content of these files, as well as without affecting the experience while accessing other files by appropriate use of the experience profiles provided according to various aspects of the present invention.

Another aspect of the present invention experience attributes controlled by dissimilar applications also to be part of an experience profile. For example, a user may associate a specific song to be played when accessing a document using word processing software.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the invention.

2. Processing System

Figure 1:
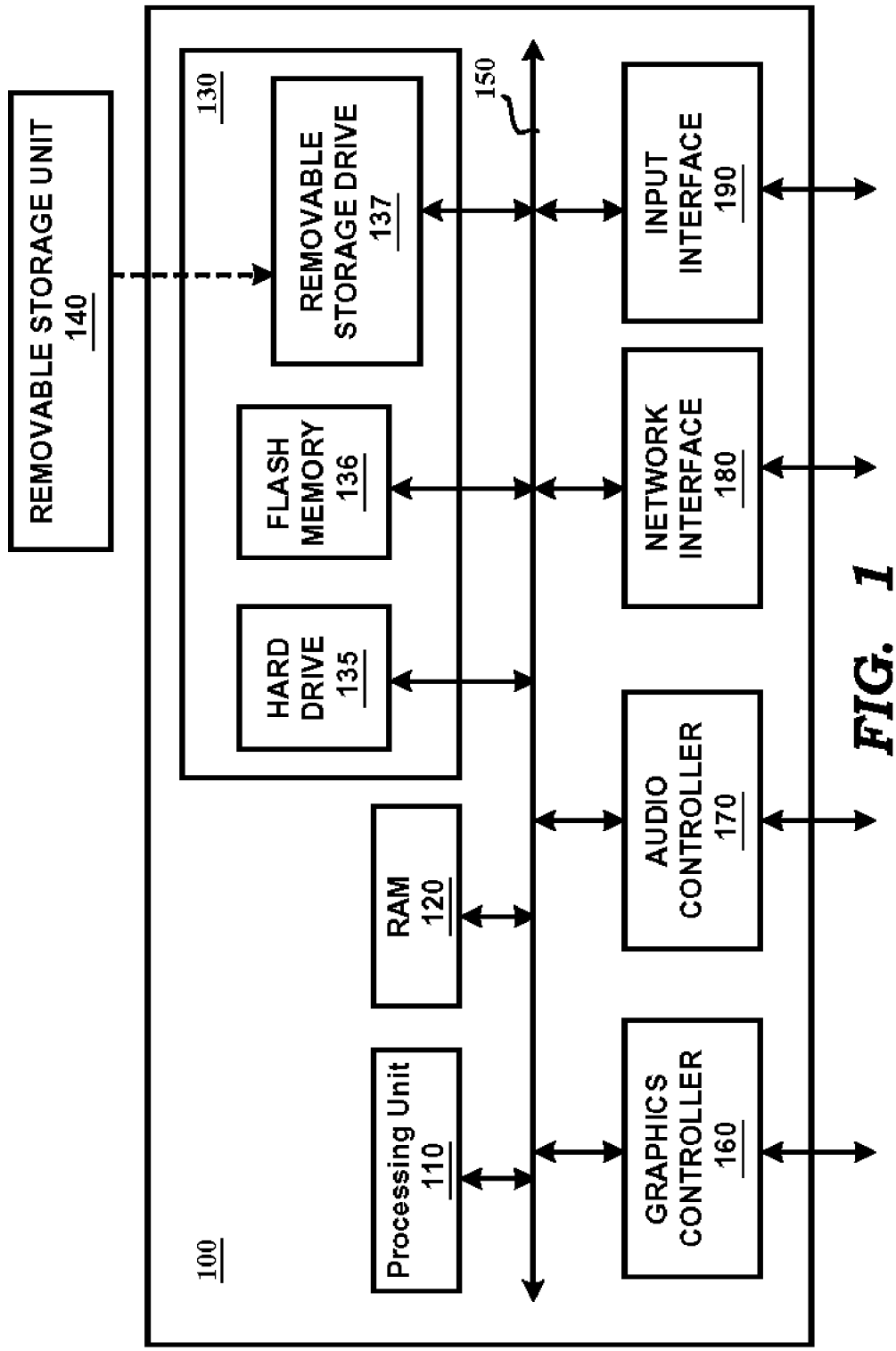
FIG. 1 is a block diagram illustrating the details of an embodiment of a digital processing system implemented substantially in the form of a software.

FIG. 1 is a block diagram illustrating the details of digital processing system 100 implementing several features of the present invention substantially in the form of software in an embodiment of the present invention. Digital processing system 100 may contain one or more processors such as processing unit 110, random access memory (RAM) 120, secondary memory 130, graphics controller 160, audio controller 170, network interface 180, and input interface 190. All the components may communicate with each other over communication path 150, which may contain several buses as is well known in the relevant arts. The components of FIG. 1 are described below in further detail.

Processing unit 110 may execute instructions stored in RAM 120 to provide several features of the present invention. Processing unit 110 may contain multiple processors, with each processor potentially being designed for a specific task. Alternatively, processing unit 110 may contain only a single processor. RAM 120 may receive instructions and data from secondary memory 130 and network interface 180 using communication path 150.

Graphics controller 160 generates display signals (e.g., in RGB format) to a display unit (not shown) based on data/instructions received from processing unit 110. The display unit contains a display screen to display the images defined by the display signals. Input interface 190 may correspond to a keyboard and/or mouse, and generally enables a user to provide various inputs that define an experience profile, associate an experience profile with an electronic file, etc. Audio controller 170 may control audio reproduction units such as speakers to perform tasks such as playing music (or any other sounds) as specified by various instructions.

In an embodiment, the experience attributes relate to the manner in which graphics controller 160 (e.g., colors, font sizes), input interface 190 (e.g., cursor type/size/speed), and audio controller 170 (the volume level, and possible the specific music file selected) provide an experience environment for the user. Various aspects of the present invention enable the corresponding experience attributes to be controlled to provide a custom experience for a user while accessing each individual electronic file as described below in further detail.

Network interface 180 enables some of the inputs (and outputs) to be provided on a network. Secondary memory 130 may contain hard drive 135, flash memory 136 and removable storage drive 137. Secondary memory 130 may store the data corresponding to experience profiles and software instructions which cause digital processing system 100 to provide several features in accordance with the present invention. Some or all of the data and instructions may be provided on removable storage unit 140, and the data and instructions may be read and provided by removable storage drive 137 to processing unit 110. Floppy drive, magnetic tape drive, CD-ROM drive, DVD Drive, Flash memory, removable memory chip (PCMCIA Card, EPROM) are examples of such removable storage drive 137.

Removable storage unit 140 may be implemented using medium and storage format compatible with removable storage drive 137 such that removable storage drive 137 can read the data and instructions. Thus, removable storage unit 140 includes a computer readable storage medium having stored therein computer software and/or data.

In this document, the term "computer program product" is used to generally refer to removable storage unit 140 or hard disk installed in hard drive 135. These computer program products are means for providing software to digital processing system 100. Processing unit 110 may retrieve the software instructions, and execute the instructions to provide various features of the present invention as described below. The description is continued with reference to a method that enables a user to have a custom desired experience while accessing an electronic file.

3. Method

Figure 2:
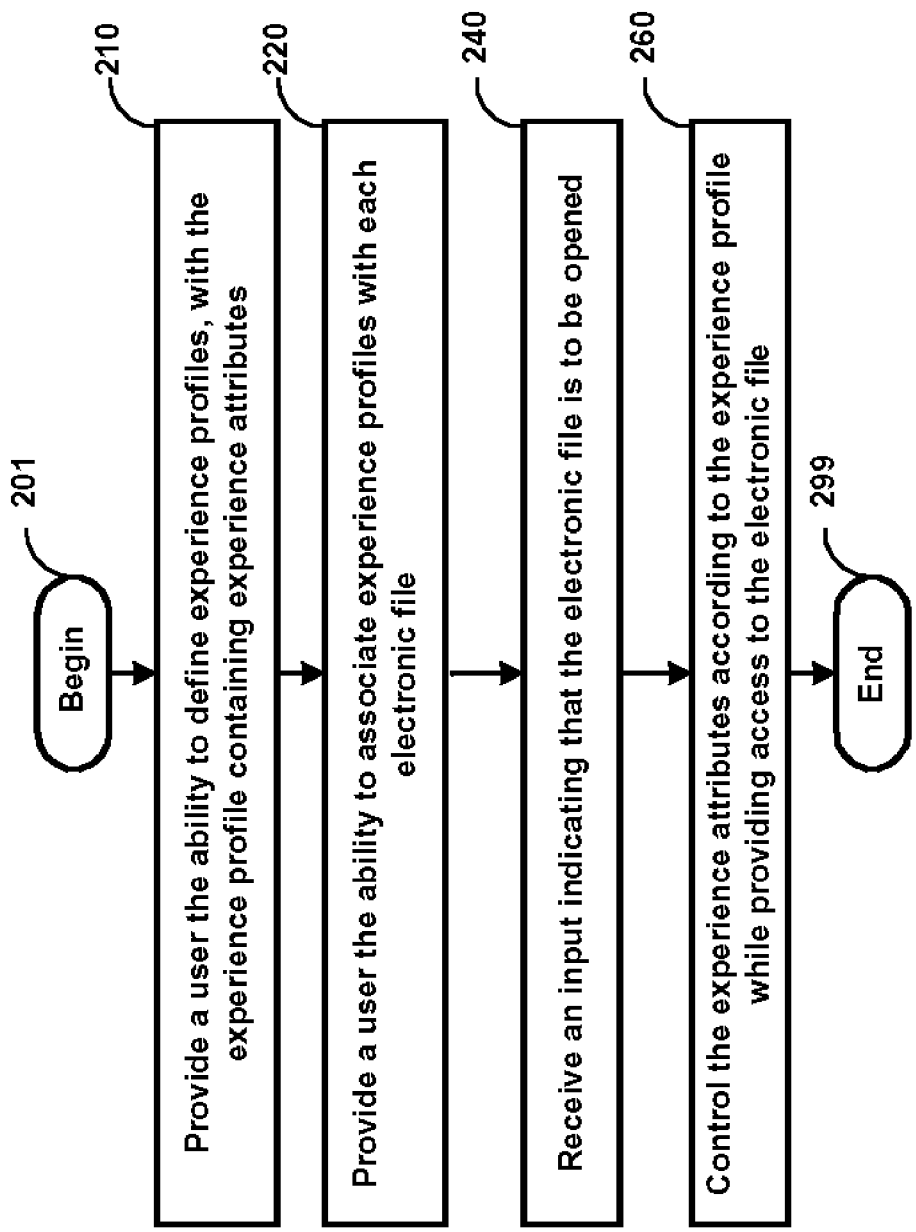
FIG. 2 is a flow-chart illustrating the manner in which a user may be enabled to have a custom desired experience while accessing an electronic file according to an aspect of the present invention.

FIG. 2 is a flow-chart illustrating the manner in which a user may have a custom desired experience while accessing electronic files according to an aspect of present invention. The flow-chart is described with reference to FIG. 1 merely for illustration. However, the features can be implemented in other environments according to several aspects of the present invention. The method begins in step 201, in which control immediately passes to step 210.

In step 210, digital processing system 100 provides a user the ability to define experience profiles, with the experience profile containing experience attributes. The experience profile may be provided external to the electronic file. That is, the experience attributes may not be embedded in the electronic file. In an embodiment described below, each experience profile is provided in the form of a separate file. The experience attributes determine the user experience in accessing an associated electronic file as described below.

In step 220, digital processing system 100 provides a user the ability to associate experience profiles with each electronic file. In an embodiment, the user may either voluntarily associate the experience profiles, or alternatively digital processing system 100 may prompt the user (by displaying a text message) to select an experience profile from a pre-defined set of experience profiles if no experience profile is associated with the electronic file.

In step 240, digital processing system 100 receives an input indicating that the electronic file is to be opened. For example, the input may be received in response to a user providing an instruction to open (e.g., by clicking on the file name) the electronic file.

In step 260, digital processing system 100 controls the experience attributes according to the experience profile while providing access to the electronic file. The experience attributes define the overall experience of a user while the electronic file is accessed. Control passes to step 299 in which the method ends.

The user may thus have a custom desired experience while accessing an electronic file. The description is continued with reference to the content of an example experience profile, and the manner in which the contained example experience attributes affect the experience of a user accessing an associated electronic file.

4. Example Experience Profile

FIG. 3 is shown containing text depicting the experience attributes of an example experience profile in one embodiment. The set of experience attributes may be used to control, for example, values corresponding to visual and listening related attributes, which together define the experience of a user while accessing an associated electronic file. Experience profile is shown containing lines 310 through 360 respectively indicating the desired values corresponding to three experience attributes corresponding to font, cursor, and the music. Each line is described in detail below.

Line 310 contains the text, "Font_'Appearance: Bold', 'Color: Blue', Size: 'medium'", which indicates that the default font of the text contained in the electronic file (associated with the experience profile) appears in Bold, Blue color, and medium size (e.g., 12). The comments (following the # sign) in the line indicate that the defaults specified (in the experience profile) are overridden by the document internal format or by application defaults, but are of higher priority than the defaults specified by the operating systems, also as noted above.

Line 340 contains the text, "Cursor_'shape: Flower', 'Color: Red'", which indicates that a display attribute corresponding to the shape of the cursor would be a red flower. Line 360 contains the text, "Music_'Song:m:\mydir\songs\Track10', 'Volume-low'", which indicates that a song corresponding to Track10 (stored in a directory structure m:\mydir\songs) is to be played at a low volume while accessing the associated electronic file (which may correspond to an editable word processing file).

The description is continued with respect to a user interface provided by digital processing system 100 in one embodiment that provides the user the ability to associate the electronic file using the experience attributes specified in an associated experience profile.

5. Example User Interface

Figure 4:
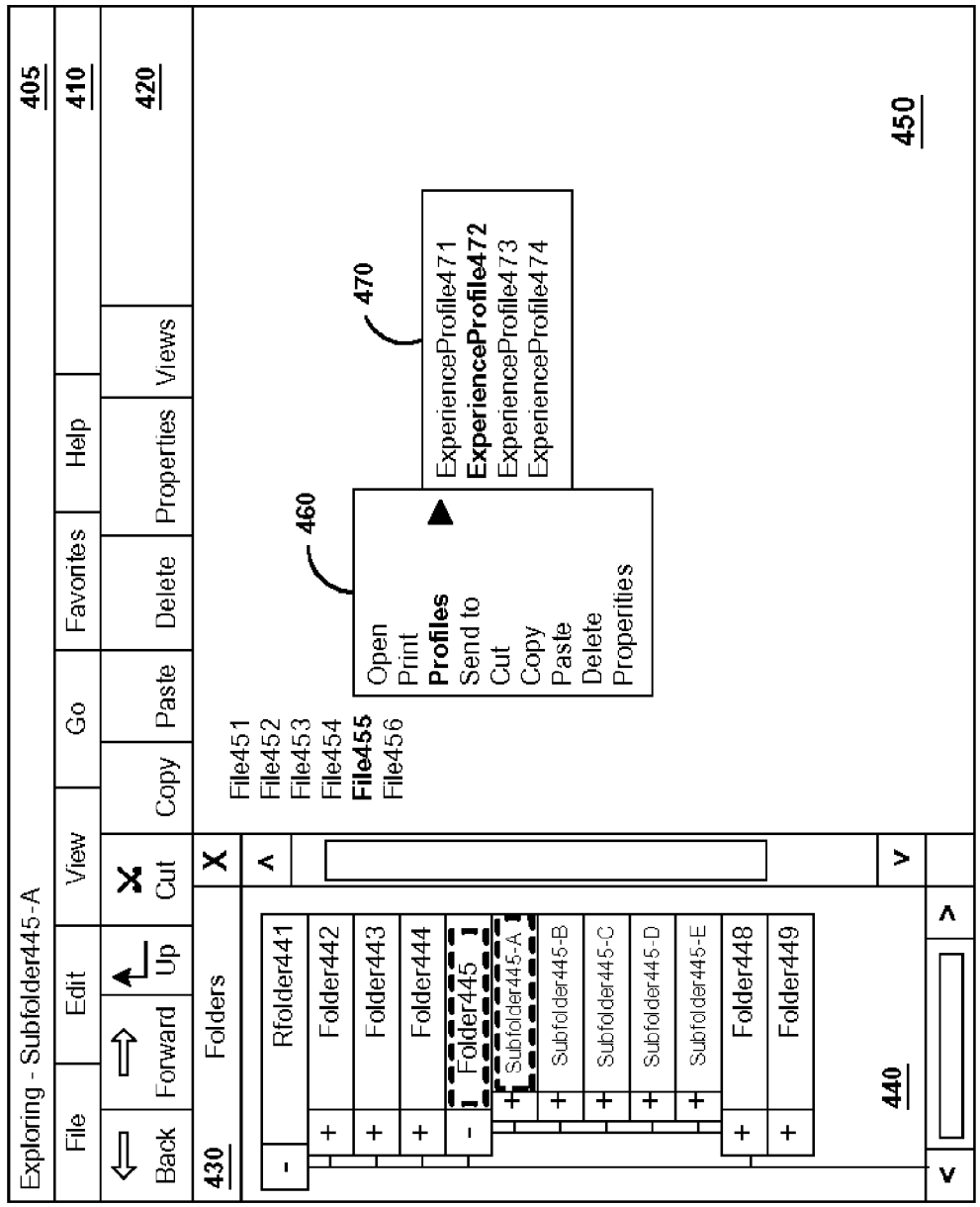
FIG. 4 is a user screen illustrating the manner in which a user may be enabled to associate a custom desired experience profile and an electronic file in one embodiment.

FIG. 4 is a screen illustrating the details of implementation of an example user interface that may be used to associate an experience profile with the electronic file being accessed. The screen is shown containing Title Bar 405, Menu Bar 410, Tools Bar 420, Explorer Bar 430, Explorer Window 440, and Content Window 450. Each component is described in detail below.

Title Bar 405 displays the title of the corresponding one of the folder selected by the user. The Title Bar 405 is shown containing Exploring—subfolder445-A, indicating that subfolder445-A (contained in Folder 445) is selected by the user. Menu Bar 410 is shown containing multiple menus (e.g., File, Edit, View, etc.). Each menu contains sub-items (e.g., Open, Cut, Copy, etc.,) that may be used to perform various operations on the file in a known way.

Tools Bar 420 provides quick access to commonly used features. Tools Bar 420 may be customized by adding/removing features (e.g., Back, Forward, Up, Cut, Copy, Paste etc.).

Explorer Bar 430 is shown containing 'Folders' indicating that Folders are displayed in the form of a directory structure shown in Explorer Window 440. Explorer Window 440 is shown displaying a root directory 'Rfolder 441' which in turn contains 'Folder442' through 'Folder449'. Folder445 is shown selected (indicated by dotted lines), and the user further selects subfolder445-A (indicated by bright dotted lines) from multiple of subfolder445-A through 445-E contained in Folder445.

Content Window 450 is shown containing five electronic files: File451, File452, File453, File454, File455 and File456 (contained in subfolder445-A). A user may select (by clicking the mouse) File455 (shown in Bold) to access File455. The user may right click on the mouse with cursor pointing to File455.

A drop-down menu containing various options Open, Print, Profiles etc., may be displayed. Assuming the user selects the 'Profiles' option, various experience profiles available as an option are displayed. The user may select 'ExperienceProfile472' (shown in Bold) from the list of experience profiles. For illustration, it is assumed that ExperienceProfile472 corresponds to the example experience profile described above with reference to FIG. 3.

If a user requests opening of file File455, digital processing system 100 opens File455 using the experience attributes specified in Experienceprofile472. Continuing with the above example, MS-Word document (File455) may be opened with text being displayed in bold and blue, red flower cursor, and a song corresponding to Track 10 being played at a low volume while the file is accessed. The user is provided access to at least a substantial portion of the content of (data stored in) file 455.

From the above, it may be appreciated that the experience attributes contained in an experience profile can be from dissimilar applications. In the above example, a user may cause a song to be played while editing a document (using, for example, a word processing software).

In an embodiment, in case of conflicting values for an experience attribute, the defaults ("operating system defaults") specified in an operating system, the defaults specified by an application ("application defaults"), the value specified by an experience profile, and the internals of a documents are provided are overridden in that order. As an illustration, if the cursor shape is specified as star, flower, and mouse respectively by the operating system, application and experience profile respectively, mouse is as the cursor since the star value is overridden by flower and flower is in turn overridden by mouse.

Thus, using experience profiles such as that described above with reference to FIG. 4, a user may have a custom desired experience while accessing electronic files according to several aspects of the present invention. However, digital processing system 100 generally needs to be implemented to support the use of such experience profiles. A general approach in an example implementation is described below in further detail.

6. Implementation

Figure 5:
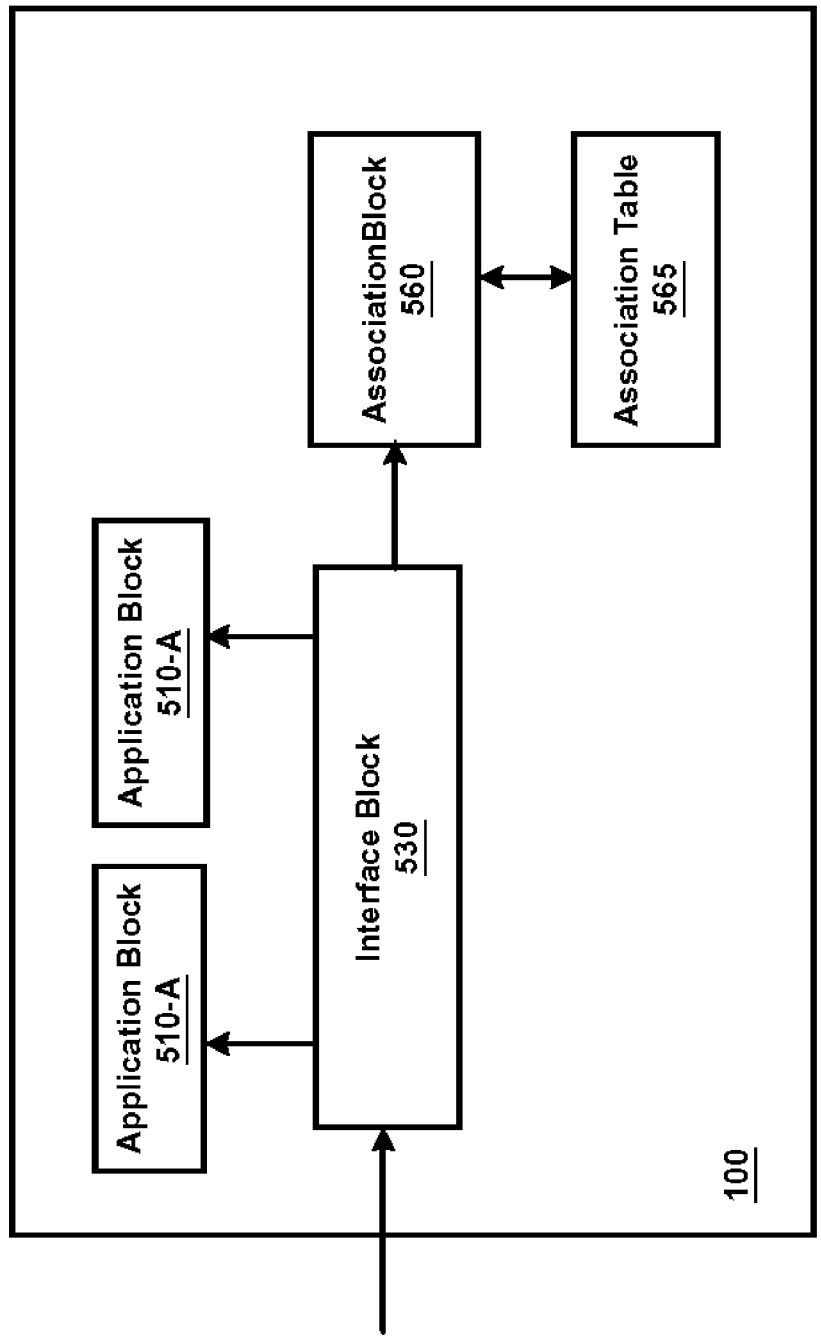
FIG. 5 is a block diagram of a digital processing system, logically illustrating the manner in which several aspects of the present invention can be implemented.

FIG. 5 is a block diagram logically illustrating the manner in which several aspects of the present invention can be implemented. The block diagram is shown containing application blocks 510-A and 510-B, interface block 530, association block 560, and association table 565. Each block is described below in further detail.

Application blocks 510-A and 510-B represent user applications such as word processing software, music players. For illustration, it is assumed that application block 510-A represents a word processing application, and application block 510-B represents a software block which enables music to be played. It is further assumed that each application block provides a suitable pre-specified interface using which the corresponding application can be instantiated and various experience attributes can be specified. The design of such interfaces generally depends on the implementation of the specific user application, and (the design) will be apparent to one skilled in the relevant arts.

Association block 560 stores (in association table 565, implemented in a memory) data indicating the association of experience profiles with the corresponding electronic files. Alternatively, data representing the association may be stored in a distributed/fragmented manner associated with each electronic file. In general, when a user indicates the association of an experience profile with an electronic file, the corresponding data may be updated. Thus, assuming a first experience profile is previously associated with a first electronic file and a second (different) experience profile is also previously associated with a second electronic file, association table 565 would have respective entries/data indicating the association of the first experience profile with the first file and the association of the second experience profile with the second file. The entries are used to control user experience, as described above.

Interface block 530 receives various inputs from the user in relation to specifying associations and invoking/instantiating the user applications. The data related to specifying associations is passed to association block 560. When the input indicates a request to access an electronic file, interface block 530 may interface with association block 560 to determine the experience profile(s) associated with the electronic file and the desired experience attributes contained in the profiles. Interface block 530 then instantiates the user application corresponding to the electronic file. The instantiation may be performed using known interfaces provided by the user application to ensure that the desired user experience is provided when accessing the electronic file.

7. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

The invention claimed is:

1. A method implemented in a digital processing system, said method comprising:

receiving inputs from a user specifying a first experience profile associated with a first electronic file and a second experience profile associated with a second electronic file, each of said first electronic file and said second electronic file containing data representing a corresponding content, an application being enabled to retrieve the corresponding content and facilitate editing of the retrieved content, said first experience profile being provided external to said first electronic file and said second experience profile being provided external to said second electronic file, said first experience profile containing a first set of values for a first set of experience attributes and said second experience profile containing a second set of values for a second set of experience attributes, said first set of experience attributes and said second set of experience attributes containing a common attribute related to displaying corresponding content for editing, said common attribute having a first value of said first set of values which is different from a second value for the same common attribute in said second set of values;

providing said user the ability to specify said first experience profile associated with a third electronic file, said third electronic file containing data representing a corresponding content;

storing a first entry indicating that said first experience profile is associated with said first electronic file and a second entry indicating that said second experience profile is associated with said second electronic file, both of said first entry and said second entry being stored in a memory and being present in said memory for at least a common duration thereafter, said first entry being stored in response to said user specifying that said first experience profile is associated with said first electronic file and said second entry being stored in response to said user specifying that said second experience profile is associated with said second electronic file;

receiving in said application, a first request to open said first electronic file for editing and a second request to open said second electronic file for editing, wherein both of said first request and said second request are received in said common duration after said storing of said first entry and said second entry in said memory, wherein said application retrieves the content of said first electronic file and facilitates editing of the content of said first electronic file upon receipt of said first request, wherein said application retrieves the content of said second electronic file and facilitates editing of the content of said second electronic file upon receipt of said second request;

controlling by said application, said first set of experience attributes according to said first set of values based on said first entry in said memory while facilitating said user to edit the content stored in said first electronic file using said application in response to said first request;

controlling by said application, said second set of experience attributes according to said second set of values based on said second entry in said memory while facilitating said user to edit the content stored in said second electronic file using said application in response to said second request, wherein the content stored in said first electronic file is displayed for editing using said first value for said common attribute in response to said first request and the content stored in said second electronic file is displayed for editing using said second value for said common attribute in response to said second request, receiving in said application a third request to open said third electronic file;

controlling by said application, said first set of experience attributes according to said first set of values while facilitating said user to edit the content stored in said third electronic file; and setting said first set of experience attributes to respective ones of said first set of values as specified in said first experience profile to change the experience while facilitating said user to edit the content stored in each of said first electronic file and said third electronic file, but not while facilitating said user to edit the content stored in said second electronic file.

2. The method of claim 1, wherein said first set of values is not the same as said second set of values and wherein said first set of experience attributes is not the same as said second set of experience attributes.

3. The method of claim 1, wherein said common attribute specifies one of a font and a shape of a cursor, wherein said controlling displays the content of the electronic file using said font for editing and displays the cursor with said shape while the content is provided for editing.

4. The method of claim 1, wherein said first electronic file comprises a document which can be edited using said application and wherein said first set of experience attributes indicates a music file to be played, said controlling said first set of experience attributes comprising playing music represented by said music file using another application while enabling editing of said document using said application, wherein said document is opened for said editing and also said music file is played in response to receiving said first open request alone in view of said first set of experience attributes of said first experience indicating that said music file is to be played.

5. The method of claim 1, wherein said application is executed on said digital processing system supported by an operating system, wherein said application and said operating system on said digital processing system respectively support an application default and an operating system default, wherein said operating system default, said application default and said first experience profile respectively specifies a first value, a second value and a third value for a first attribute, and wherein said first electronic file does not internally contain a value for said first attribute, wherein said first attribute is contained in said first set of attributes and said third value is contained in said first set of values, wherein said controlling controls said first attribute according to said third value while enabling said user to edit the content of said first electronic file using said application, wherein said operating system default and said application default respectively specifies a fourth value and a fifth value for a second attribute, and neither said first experience profile nor said first electronic file specifies a value for said second attribute, wherein said second attribute is contained in said first set of attributes, wherein said controlling controls said second attribute according to said fifth value while enabling said user to edit the content of said first electronic file using said application, wherein said operating system default specifies a sixth value for a third attribute, and none of said first experience profile, said first electronic file and said application default specifies a corresponding value for said third attribute, wherein said third attribute is contained in said first set of attributes, wherein said controlling controls said third attribute according to said sixth value while enabling said user to edit the content of said first electronic file using said application, wherein said operating system default, said application default, said first experience profile and said first electronic file respectively specifies a seventh value, a eighth value, a ninth value and a tenth value for a fourth attribute, wherein said controlling controls said fourth attribute according to said tenth value while enabling said user to edit the content of said first electronic file using said application, whereby values provided in said operating system default, said application default, said first experience profile and said first electronic file are overridden in that order while said user edits the content of said first electronic file.

6. The method of claim 1, wherein said receiving of said inputs from said user comprises:
displaying on a display unit a plurality of experience profiles available for association with individual ones of specific electronic files as desired by said user, wherein said plurality of experience profiles comprising said first experience profile and said second experience profile; and
receiving a selection from said user based on the display on said display unit, wherein said selection indicates that said first experience profile is to be associated with said first electronic file,
wherein said controlling enables said user to edit the content of said first electronic file according to said first experience profile in response to receiving said selection.

7. The method of claim 1, wherein said memory is a non-volatile memory such that storing stores said association information in said non-volatile memory.

8. The method of claim 1, wherein said application is executed on said digital processing system supported by an operating system, wherein said application and said operating system on said digital processing system respectively support an application default and an operating system default,
wherein said operating system default and said application default respectively specifies a first value and a second value for a first attribute,
wherein said first experience profile associated with said first electronic file and said second experience profile associated with said second electronic file respectively specify a third value and a fourth value for said first attribute,
wherein neither of said first electronic file and said second electronic file internally contains a value for said first attribute,
wherein said first attribute is contained in said first set of attributes, said third value is contained in said first set of values, and said fourth value is contained in said second set of values,
wherein said controlling controls said first attribute according to said third value while enabling said user to edit the content of said first electronic file using said application by virtue of said first entry,
wherein said controlling controls said first attribute according to said fourth value while enabling said user to edit the content of said second electronic file using said application by virtue of said second entry.

9. A non-transitory computer readable medium storing one or more sequences of instructions, wherein execution of said one or more sequences of instructions by one or more processors contained in a digital processing system causes said digital processing system to perform the actions of:
receiving inputs from a user specifying a first experience profile associated with a first electronic file and a second experience profile associated with a second electronic file,
each of said first electronic file and said second electronic file containing data representing a corresponding content, an application being enabled to retrieve the corresponding content and facilitate editing of the retrieved content,
said first experience profile being provided external to said first electronic file and said second experience profile being provided external to said second electronic file,
said first experience profile containing a first set of values for a first set of experience attributes and said second experience profile containing a second set of values for a second set of experience attributes, said first set of experience attributes and said second set of experience attributes containing a common attribute related to displaying corresponding content for editing, said common attribute having a first value of said first set of values which is different from a second value for the same common attribute in said second set of values;
providing said user the ability to specify said first experience profile associated with a third electronic file, said third electronic file containing data representing a corresponding content;
receiving in said application, a first request to open said first electronic file for editing and a second request to open said second electronic file for editing, wherein both of said first request and said second request are received after said user associates said first experience profile with said first electronic file and said second experience profile with said second electronic file, wherein said application retrieves the content of said first electronic file and facilitates editing of the content of said first electronic file upon receipt of said first request, wherein said application retrieves the content of said second electronic file and facilitates editing of the content of said second electronic file upon receipt of said second request;
controlling by said application, said first set of experience attributes according to said first set of values while facilitating said user to edit the content stored in said first electronic file using said application in response to said first request;

controlling by said application, said second set of experience attributes according to said second set of values while facilitating said user to edit the content stored in said second electronic file using said application in response to said second request, wherein the content stored in said first electronic file is displayed for editing using said first value for said common attribute in response to said first request and the content stored in said second electronic file is displayed for editing using said second value for said common attribute in response to said second request, receiving in said application a third request to open said third electronic file;

controlling by said application, said first set of experience attributes according to said first set of values while facilitating said user to edit the content stored in said third electronic file; and setting said first set of experience attributes to respective ones of said first set of values as specified in said first experience profile to change the experience while facilitating said user to edit the content stored in each of said first electronic file and said third electronic file, but not while facilitating said user to edit the content stored in said second electronic file.

10. The non-transitory computer readable medium of claim 9, wherein said first set of values is not the same as said second set of values and wherein said first set of experience attributes is not the same as said second set of experience attributes.

11. The non-transitory computer readable medium of claim 9, further comprising one or more instructions for:

storing an association information indicating that said first experience profile is associated with said first electronic file and said second experience profile is associated with said second electronic file when said user provides said association information;

receiving an input to open said first electronic file after said storing of said association information;

examining said association information to determine that said first experience profile is to be used by said application while facilitating said user to edit the content of said first electronic file, wherein said examining is performed in response to said receiving; and facilitating said user to edit the content of said first electronic file while controlling said first set of experience attributes according to said first set of values.

12. The non-transitory computer readable medium of claim 11, wherein said common attribute specifies one of a font and a shape of a cursor, wherein said controlling displays the content of the electronic file using said font for editing and displays the cursor with said shape while the content is provided for editing.

13. The computer readable medium of claim 11, wherein said first electronic file comprises a document which can be edited using said application and wherein said first set of experience attributes indicates a music file to be played, said controlling said first set of experience attributes comprising playing music represented by said music file using another application while enabling editing of said document using said application, wherein said document is opened for said editing and also said music file is played in response to receiving said first open request alone in view of said first set of experience attributes of said first experience indicating that said music file is to be played.

14. The non-transitory computer readable medium of claim 13, wherein said application is executed on said digital processing system supported by an operating system, wherein said application and said operating system respectively support an application default and an operating system default, wherein said operating system default, said application default and said first experience profile respectively specifies a first value, a second value and a third value for a first attribute, and wherein said first electronic file does not internally contain a value for said first attribute, wherein said first attribute is contained in said first set of attributes and said third value is contained in said first set of values, wherein said controlling controls said first attribute according to said third value while enabling said user to edit the content of said first electronic file using said application, wherein said operating system default and said application default respectively specifies a fourth value and a fifth value for a second attribute, and neither said first experience profile nor said first electronic file specifies a value for said second attribute, wherein said second attribute is contained in said first set of attributes, wherein said controlling controls said second attribute according to said fifth value while enabling said user to edit the content of said first electronic file using said application, wherein said operating system default specifies a sixth value for a third attribute, and none of said first experience profile, said first electronic file and said application default specifies a corresponding value for said third attribute, wherein said third attribute is contained in said first set of attributes, wherein said controlling controls said third attribute according to said sixth value while enabling said user to edit the content of said first electronic file using said application, wherein said operating system default, said application default, said first experience profile and said first electronic file respectively specifies a seventh value, a eighth value, a ninth value and a tenth value for a fourth attribute, wherein said controlling controls said fourth attribute according to said tenth value while enabling said user to edit the content of said first electronic file using said application, whereby values provided in said operating system default, said application default, said first experience profile and said first electronic file are overridden in that order while said user edits the content of said first electronic file.

15. The non-transitory computer readable medium of claim 9, wherein said receiving of said inputs from said user comprises:

displaying on a display unit a plurality of experience profiles available for association with individual ones of specific electronic files as desired by said user, wherein said plurality of experience profiles comprising said first experience profile and said second experience profile; and receiving a selection from said user based on the display on said display unit, wherein said selection indicates that said first experience profile is to be associated with said first electronic file, wherein said controlling provides access to the data stored in said first electronic file according to said first experience profile in response to receiving said selection.

16. A digital processing system comprising:
a processor;
a random access memory (RAM);
a machine readable medium to store one or more instructions, which when retrieved into said RAM and executed by said processor causes said digital processing system perform the actions of:
  receiving inputs from a user specifying a first experience profile associated with a first electronic file and a second experience profile associated with a second electronic file,
  each of said first electronic file and said second electronic file containing data representing a corresponding content, an application being enabled to retrieve the corresponding content and facilitate editing of the retrieved content, said first experience profile containing a first set of values for a first set of experience attributes and said second experience profile containing a second set of values for a second set of experience attributes,
  said first experience profile being provided external to said first electronic file and said second experience profile being provided external to said second electronic file,
  said first set of experience attributes and said second set of experience attributes containing a common attribute related to displaying corresponding content for editing, said common attribute having a first value of said first set of values which is different from a second value for the same common attribute in said second set of values;
  storing a first entry indicating that said first experience profile is associated with said first electronic file and a second entry indicating that said second experience profile is associated with said second electronic file, both of said first entry and said second entry being stored in a memory and being present in said memory for at least a common duration thereafter, said first entry being stored in response to said user specifying that said first experience profile is associated with said first electronic file and said second entry being stored in response to said user specifying that said second experience profile is associated with said second electronic file;
  providing said user the ability to specify said first experience profile associated with a third electronic file, said third electronic file containing data representing a corresponding content;
  receiving in said application, a first request to open said first electronic file for editing and a second request to open said second electronic file for editing, wherein both of said first request and said second request are received in said common duration after said storing of said first entry and said second entry in said memory, wherein said application retrieves the content of said first electronic file and facilitates editing of the content of said first electronic file upon receipt of said first request, wherein said application retrieves the content of said second electronic file and facilitates editing of the content of said second electronic file upon receipt of said second request;
  controlling by said application, said first set of experience attributes according to said first set of values based on said first entry in said memory while facilitating said user to edit the content stored in said first electronic file using said application in response to said first request;
  controlling by said application, said second set of experience attributes according to said second set of values based on said second entry in said memory while facilitating said user to edit the content stored in said second electronic file using said application in response to said second request,
  wherein the content stored in said first electronic file is displayed for editing using said first value for said common attribute in response to said first request and the content stored in said second electronic file is displayed for editing using said second value for said common attribute in response to said second request,
  receiving in said application a third request to open said third electronic file;
  controlling by said application, said first set of experience attributes according to said first set of values while facilitating said user to edit the content stored in said third electronic file; and
  setting said first set of experience attributes to respective ones of said first set of values as specified in said first experience profile to change the experience while facilitating said user to edit the content stored in each of said first electronic file and said third electronic file, but not while facilitating said user to edit the content stored in said second electronic file.

17. The digital processing system of claim 16, wherein said first electronic file comprises a document which can be edited using said application and wherein said first set of experience attributes indicates a music file to be played, said controlling said first set of experience attributes comprising playing music represented by said music file using another application while enabling editing of said document using said application,
  wherein said document is opened for said editing and also said music file is played in response to receiving said first open request alone in view of said first set of experience attributes of said first experience indicating that said music file is to be played.

18. The digital processing system of claim 16, wherein said application is executed on said digital processing system supported by an operating system, wherein said application and said operating system on said digital processing system respectively support an application default and an operating system default,
  wherein said operating system default, said application default and said first experience profile respectively specifies a first value, a second value and a third value for a first attribute, and wherein said first electronic file does not internally contain a value for said first attribute,
  wherein said first attribute is contained in said first set of attributes and said third value is contained in said first set of values,
  wherein said controlling controls said first attribute according to said third value while enabling said user to edit the content of said first electronic file using said application,
  wherein said operating system default and said application default respectively specifies a fourth value and a fifth value for a second attribute, and neither said first experience profile nor said first electronic file specifies a value for said second attribute,
  wherein said second attribute is contained in said first set of attributes, wherein said controlling controls said second attribute according to said fifth value while enabling said user to edit the content of said first electronic file using said application, wherein said operating system default specifies a sixth value for a third attribute, and none of said first experience profile, said first electronic file and said application default specifies a corresponding value for said third attribute, wherein said third attribute is contained in said first set of attributes, wherein said controlling controls said third attribute according to said sixth value while enabling said user to edit the content of said first electronic file using said application, wherein said operating system default, said application default, said first experience profile and said first electronic file respectively specifies a seventh value, a eighth value, a ninth value and a tenth value for a fourth attribute, wherein said controlling controls said fourth attribute according to said tenth value while enabling said user to edit the content of said first electronic file using said application, whereby values provided in said operating system default, said application default, said first experience profile and said first electronic file are overridden in that order while said user edits the content of said first electronic file.

19. The digital processing system of claim 16, wherein said application is executed on said digital processing system supported by an operating system, wherein said application and said operating system on said digital processing system respectively support an application default and an operating system default, wherein said operating system default and said application default respectively specifies a first value and a second value for a first attribute, wherein said first experience profile associated with said first electronic file and said second experience profile associated with said second electronic file respectively specify a third value and a fourth value for said first attribute, wherein neither of said first electronic file and said second electronic file internally contains a value for said first attribute, wherein said first attribute is contained in said first set of attributes, said third value is contained in said first set of values, and said fourth value is contained in said second set of values, wherein said controlling controls said first attribute according to said third value while enabling said user to edit the content of said first electronic file using said application by virtue of said first entry, wherein said controlling controls said first attribute according to said fourth value while enabling said user to edit the content of said second electronic file using said application by virtue of said second entry.

\* \* \* \* \*

UNITED STATES PATENT AND TRADEMARK OFFICE
CERTIFICATE OF CORRECTION

| | | |
|---|---|---|
| PATENT NO. | : 8,812,967 B2 | Page 1 of 1 |
| APPLICATION NO. | : 10/709791 | |
| DATED | : August 19, 2014 | |
| INVENTOR(S) | : Seshadri | |

It is certified that error appears in the above-identified patent and that said Letters Patent is hereby corrected as shown below:

In the Drawings

On sheet 4 of 5, in figure 4, under Reference Numeral 460, line 9, delete "Properities" and insert -- Properties --, therefor.

In the Specification

In column 1, line 36, delete "option" and insert -- Option --, therefor.

In column 1, line 45, delete "respect" and insert -- Respect --, therefor.

In the Claims

In column 11, line 57, claim 13, delete "computer readable medium" and insert -- "non-transitory computer readable medium" --, therefor.

Signed and Sealed this
Seventeenth Day of March, 2015

Michelle K. Lee
*Director of the United States Patent and Trademark Office*

UNITED STATES PATENT AND TRADEMARK OFFICE
CERTIFICATE OF CORRECTION

Page 1 of 1

| | |
|---|---|
| PATENT NO. | : 8,812,967 B2 |
| APPLICATION NO. | : 10/709791 |
| DATED | : August 19, 2014 |
| INVENTOR(S) | : Seshadri |

It is certified that error appears in the above-identified patent and that said Letters Patent is hereby corrected as shown below:

On the title page, in the illustrative figure, under Reference Numeral 460, line 9, delete "Properities" and insert -- Properties --.

In the Drawings

On sheet 4 of 5, in figure 4, under Reference Numeral 460, line 9, delete "Properities" and insert -- Properties --, therefor.

In the Specification

In column 1, line 36, delete "option" and insert -- Option --, therefor.

In column 1, line 45, delete "respect" and insert -- Respect --, therefor.

In the Claims

In column 11, line 57, claim 13, delete "computer readable medium" and insert -- "non-transitory computer readable medium" --, therefor.

This certificate supersedes the Certificate of Correction issued March 17, 2015.

Signed and Sealed this
Fourteenth Day of April, 2015

Michelle K. Lee
*Director of the United States Patent and Trademark Office*